(12) United States Patent
Kato

(10) Patent No.: US 11,016,499 B2
(45) Date of Patent: May 25, 2021

(54) MEASUREMENT DEVICE, MEASUREMENT METHOD AND PROGRAM

(71) Applicant: Pioneer Corporation, Tokyo (JP)

(72) Inventor: Masahiro Kato, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 116 days.

(21) Appl. No.: 16/321,550

(22) PCT Filed: Jul. 29, 2016

(86) PCT No.: PCT/JP2016/072409
§ 371 (c)(1),
(2) Date: Jan. 29, 2019

(87) PCT Pub. No.: WO2018/020680
PCT Pub. Date: Feb. 1, 2018

(65) Prior Publication Data
US 2019/0163200 A1    May 30, 2019

(51) Int. Cl.
*G05D 1/02* (2020.01)
*G08G 1/16* (2006.01)
(Continued)

(52) U.S. Cl.
CPC ......... *G05D 1/0253* (2013.01); *B60W 40/105* (2013.01); *G05D 1/0223* (2013.01);
(Continued)

(58) Field of Classification Search
CPC .. H04N 7/00; H04N 7/10; H04N 7/18; G08G 1/16; G08G 1/052; B60W 40/02;
(Continued)

(56) References Cited

U.S. PATENT DOCUMENTS

2009/0299631 A1\* 12/2009 Hawes ................... G01S 17/87
701/300
2010/0017128 A1    1/2010 Zeng
(Continued)

FOREIGN PATENT DOCUMENTS

JP    2006-160116 A    6/2006
JP    2014-89686 A    5/2014

OTHER PUBLICATIONS

European Search Report for related EP App. No. PCT/JP2016072409 dated Mar. 10, 2020; 6 pages.
(Continued)

*Primary Examiner* — Anthony R Jimenez
(74) *Attorney, Agent, or Firm* — Procopio, Cory, Hargreaves & Savitch LLP

(57) ABSTRACT

The above measurement device acquires a distance from a vehicle to a partial area of a feature and an angle formed by a direction of viewing the partial area from the vehicle and a traveling direction of the vehicle, for a first area and a second area, the first area being the partial area at a first time, the second area being the partial area different from the first area at a second time. Also, the measurement device acquires length information including a width of the feature. Then, the measurement device calculates a speed of the vehicle from the first time to the second time based on acquisition results by the first acquisition unit and the second acquisition unit. Thus, the speed of the vehicle may be calculated by a scan of a feature in one period.

6 Claims, 6 Drawing Sheets

(51) Int. Cl.
    *B60W 40/105* (2012.01)
    *G06K 9/00* (2006.01)
    *G08G 1/052* (2006.01)
    *G06F 17/11* (2006.01)

(52) U.S. Cl.
    CPC ......... *G06K 9/00664* (2013.01); *G08G 1/052* (2013.01); *G08G 1/16* (2013.01); *G06F 17/11* (2013.01)

(58) Field of Classification Search
    CPC .... B60W 40/10; B60W 40/105; B60W 20/00; B60W 20/10; B60W 20/12; B60W 20/16; B60W 20/18; B60W 2520/00; B60W 2520/04; B60W 2520/12; B60W 2520/28; B60W 2550/00; B60W 2550/10; B60W 2550/14; B60W 2550/20; B60W 2550/30; B60W 2550/302; B60W 2550/306; B60W 2550/308; B60T 7/12; B60T 8/172; B60R 21/00; B60K 31/00; G06F 17/00; G06F 17/10; G06F 17/11; G06F 19/00; G06K 9/00; G06K 9/00664; G06K 7/10; G01J 5/00; G01J 5/02; G05D 1/0223; G05D 1/0253; G01C 21/00; G01C 21/10; G01C 21/12; G01C 21/06; G01B 11/00; G01B 11/02; G01B 11/022
    USPC .......................................................... 701/301
    See application file for complete search history.

(56) References Cited

U.S. PATENT DOCUMENTS

2013/0322697 A1* 12/2013 Grindstaff ............... G06T 7/246
                                                         382/107
2014/0121954 A1   5/2014  Lee et al.
2015/0025786 A1   1/2015  Hohm et al.

OTHER PUBLICATIONS

International Search Report for related International Application No. PCT/JP2016/072409, dated Nov. 1, 2016; English translation provided; 2 pages.

* cited by examiner

FIG. 3

| | $\psi\_dot(t) = 0$ [deg/s] | $\psi\_dot(t) = 45$ [deg/s] | $\psi\_dot(t) = 90$ [deg/s] |
|---|---|---|---|
| V=10[km/h] | Δx =1.3264[cm]<br>Δy =0[cm] | Δx = 1.3264[cm]<br>Δy = − 0.0025[cm] | Δx = 1.3264[cm]<br>Δy = − 0.0050[cm] |
| V=50[km/h] | Δx =6.6319[cm]<br>Δy =0[cm] | Δx = 6.6319[cm]<br>Δy = − 0.0124[cm] | Δx = 6.6319[cm]<br>Δy = − 0.0249[cm] |
| V=100[km/h] | Δx =13.2639[cm]<br>Δy =0[cm] | Δx = 13.2639[cm]<br>Δy = − 0.0249[cm] | Δx = 13.2638[cm]<br>Δy = − 0.0497[cm] |

FLAT ROAD SIGN

MEASUREMENT DEVICE, MEASUREMENT METHOD AND PROGRAM

CROSS-REFERENCE TO RELATED APPLICATIONS

This application is a U.S. National Stage entry of PCT Application No: PCT/JP2016/072409 filed Jul. 29, 2016, the contents of which are incorporated herein by reference.

TECHNICAL FIELD

The present invention relates to a technique of measuring speed of a moving body.

BACKGROUND TECHNIQUE

There is known a technique of measuring a distance and a relative speed to a surrounding object by a measurement device such as a LiDAR (Light Detection And Ranging), and estimating speed of a vehicle from a measurement result (For example, see. Patent Reference-1).

PRIOR ART REFERENCE

Patent Reference

Patent Reference-1: Japanese Patent Application Laid-Open under No. 2014-89686

SUMMARY OF THE INVENTION

Problem to be Solved by the Invention

The technique of Patent Reference-1 acquires relative speeds of a vehicle for plural groups of vehicles and surrounding objects, and adopts data having highest reliability among them. Therefore, it requires scanning of multiple times by a sensor, and the accuracy deteriorates if the number of the objective groups decreases.

The above is an example of the problem to be solved by the present invention. It is an object of the present invention to provide a measurement device capable of calculating a speed of a moving body by a scan of a feature in one period.

Means for Solving the Problem

An invention described in claims is a measurement device comprising: a first acquisition unit configured to acquire a distance from a vehicle to a partial area of a feature and an angle formed by a direction of viewing the partial area from the vehicle and a traveling direction of the vehicle, for a first area and a second area, the first area being the partial area at a first time, the second area being the partial area different from the first area at a second time; a second acquisition unit configured to acquire length information including awidthof the feature; anda speedcalculationunit configuredto calculate a speed of the vehicle from the first time to the second time based on acquisition results by the first acquisition unit and the second acquisition unit.

Another invention described in claims is a measurement method executed by a measurement device comprising: a first acquisition process of acquiring a distance from a vehicle to a partial area of a feature and an angle formed by a direction of viewing the partial area from the vehicle and a traveling direction of the vehicle, for a first area and a second area, the first area being the partial area at a first time, the second area being the partial area different from the first area at a second time; a second acquisition process of acquiring length information including a width of the feature; and a speed calculation process of calculating a speed of the vehicle from the first time to the second time based on acquisition results by the first acquisition process and the second acquisition process.

Still another invention described in claims is a program executed by a measurement device comprising a computer, the program causing the computer to function as: a first acquisition unit configured to acquire a distance from a vehicle to a partial area of a feature and an angle formed by a direction of viewing the partial area from the vehicle and a traveling direction of the vehicle, for a first area and a second area, the first area being the partial area at a first time, the second area being the partial area different from the first area at a second time; a second acquisition unit configured to acquire length information including a width of the feature; and a speed calculation unit configured to calculate a speed of the vehicle from the first time to the second time based on acquisition results by the first acquisition unit and the second acquisition unit.

BRIEF DESCRIPTION OF THE DRAWINGS

FIG. 3 illustrates a calculation example of moving amount of the vehicle in the detection time of the feature.

FORMS TO EXERCISE INVENTION

Figure 1B:
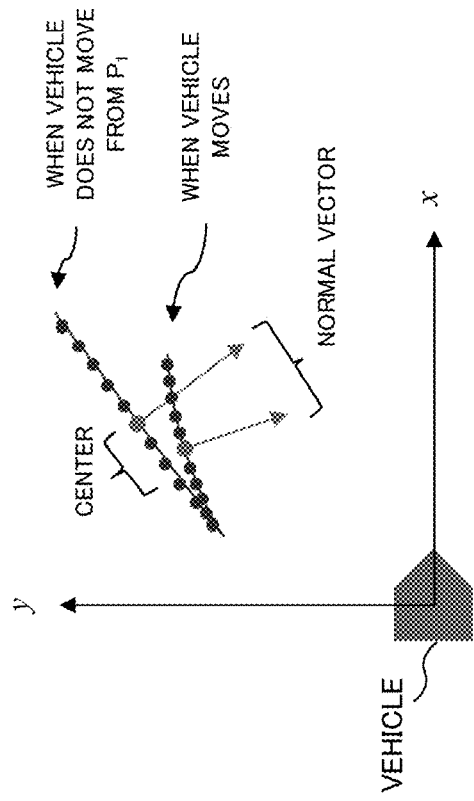
FIGS. 1A and 1B illustrate a manner that a LiDAR detects a feature while a vehicle is moving.

According to one aspect of the present invention, there is provided a measurement device comprising: a first acquisition unit configured to acquire a distance from a vehicle to a partial area of a feature and an angle formed by a direction of viewing the partial area from the vehicle and a traveling direction of the vehicle, for a first area and a second area, the first area being the partial area at a first time, the second area being the partial area different from the first area at a second time; a second acquisition unit configured to acquire length information including a width of the feature; and a speed calculation unit configured to calculate a speed of the vehicle from the first time to the second time based on acquisition results by the first acquisition unit and the second acquisition unit.

The above measurement device acquires a distance from a vehicle to a partial area of a feature and an angle formed by a direction of viewing the partial area from the vehicle and a traveling direction of the vehicle, for a first area and a second area. The first area is the partial area at a first time, and the second area is the partial area different from the first area at a second time. Also, the measurement device acquires length information including a width of the feature. Then, the measurement device calculates a speed of the vehicle from the first time to the second time based on acquisition results by the first acquisition unit and the second acquisition unit. Thus, the speed of the vehicle may be calculated by a scan of a feature in one period.

In one mode, the above measurement device further comprises a coordinates calculation unit configured to calculate first coordinates, which are the coordinates of the first area with respect to a position of the vehicle serving as a center, based on the distance and the angle for the first area, and calculate second coordinates, which are the coordinates of the second area with respect to the position of the vehicle serving as the center, based on the distance and the angle for the second area, wherein the speed calculation unit calculates the speed of the vehicle based on the first coordinates, the second coordinates, the width of the feature and a time from the first time to the second time. In this mode, the speed of the vehicle is calculated by using the first coordinates corresponding to the first area of the feature and the second coordinates corresponding to the second area of the feature.

In a preferable example, when the first coordinates are $(x1, y1)$, the second coordinates are $(x_n, y_n)$, the width of the feature is "W", and the time from the first time to the second time is "$\Delta T$", the speed calculation unit calculates the speed V of the vehicle by:

$$V = \frac{\sqrt{W^2 - (y_n - y_1)^2} - (x_n - x_1)}{\Delta T}.$$

In another mode, the above measurement device further comprises an average speed calculation unit configured to calculate an average speed which is an average the speeds of the vehicle calculated by the speed calculation unit for plural combinations of the first area and the second area. In this mode, the speed of the vehicle is calculated for each of the plural combinations of the first area and the second area for one feature, and they are averaged to enhance accuracy.

According to another aspect of the present invention, there is provided a measurement method executed by a measurement device comprising: a first acquisition process of acquiring a distance from a vehicle to a partial area of a feature and an angle formed by a direction of viewing the partial area from the vehicle and a traveling direction of the vehicle, for a first area and a second area, the first area being the partial area at a first time, the second area being the partial area different from the first area at a second time; a second acquisition process of acquiring length information including a width of the feature; and a speed calculation process of calculating a speed of the vehicle from the first time to the second time based on acquisition results by the first acquisition process and the second acquisition process. By this method, the speed of the vehicle may be calculated by a scan of a feature in one period.

According to still another aspect of the present invention, there is provided a program executed by a measurement device comprising a computer, the program causing the computer to function as: a first acquisition unit configured to acquire a distance from a vehicle to a partial area of a feature and an angle formed by a direction of viewing the partial area from the vehicle and a traveling direction of the vehicle, for a first area and a second area, the first area being the partial area at a first time, the second area being the partial area different from the first area at a second time; a second acquisition unit configured to acquire length information including a width of the feature; and a speed calculation unit configured to calculate a speed of the vehicle from the first time to the second time based on acquisition results by the first acquisition unit and the second acquisition unit. By executing the program by the computer, the above measurement device can be realized. This program may be handled in a manner stored in a storage medium.

Embodiment

Next, a preferred embodiment of the present invention will be described with reference to the attached drawings.

[Explanation of Principle]

In case of a LiDAR of horizontal-scan type, the time detecting a left edge of an objective feature is different from the time detecting a right edge of the objective feature. Therefore, if a vehicle itself moves between the times, a reference position and a reference direction of the detection change. FIG. 1A illustrates a manner that a LiDAR detects one feature while a vehicle is moving. The vehicle exists at the position $P_1$ when the LiDAR detects the left edge of the feature, and the vehicle has moved to the position $P_n$ when the LiDAR detects the right edge of the feature.

Figure 1A:
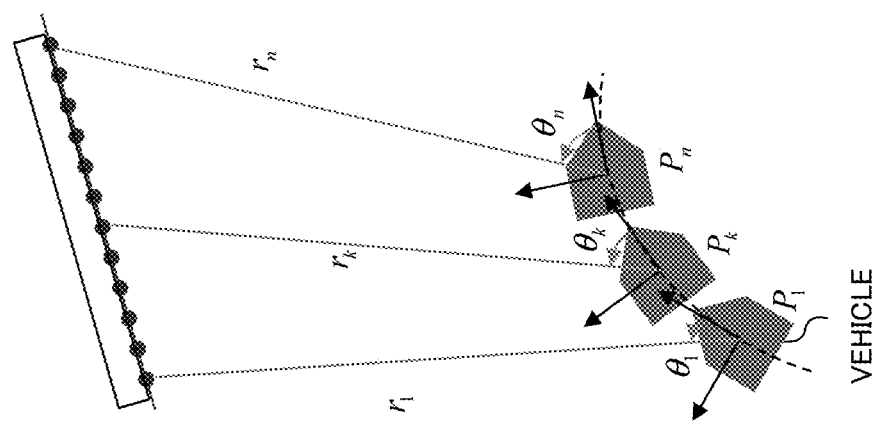

FIG. 1B illustrates (x, y) coordinates having the position of the vehicle as its origin, obtained by converting the coordinates (r, θ) of points on the feature detected by the LiDAR in the example of FIG. LA. Since the distance to the feature and the direction of the feature change according to the movement of the vehicle, the plane of the feature becomes distorted. As a result, the center (or center-of-gravity) coordinates of the feature and the normal vectors do not coincide.

Figure 2A:
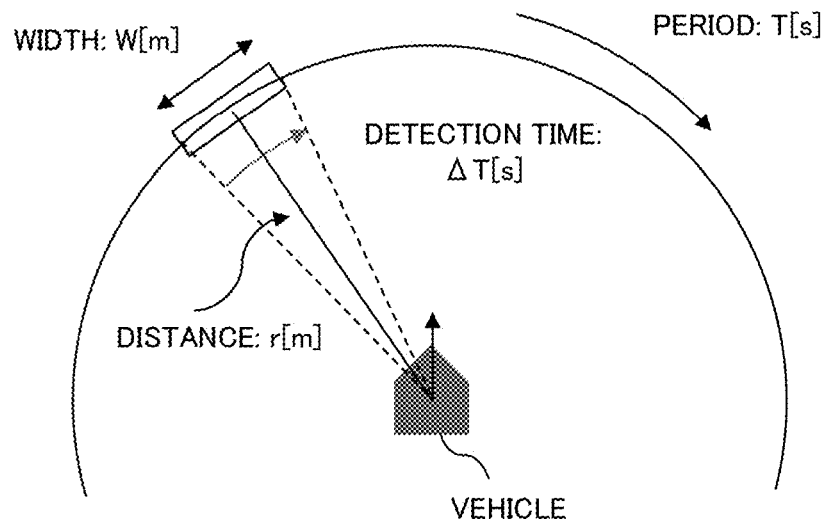
FIGS. 2A and 2B are diagrams for explaining detection coordinates of the feature in a detection time of the feature.

As shown in FIG. 2A, when a scan period of the LiDAR of horizontal-scan type is T[s], a scan angular frequency ω [rad/s] is given as: ω=2π/T, and a moving speed of a beam r[m] ahead is rω [m/s]. If there is a road sign having a width W[m], a time ΔT required to detect (scan) the road sign is given as follows:

$$\Delta T = \frac{W}{r\omega} = \frac{W}{2\pi r}T \tag{1}$$

Namely, supposing that the scan by the LiDAR is clockwise as shown in FIG. 2A, there is a time difference ΔT between the timings of detecting the left edge and the right edge of the road sign. If the scan period of the LiDAR is 100 [ms], the time required for the beam to detect the road sign existing 10 [m] ahead and having a width 60 [cm] is calculated as ΔT=0.955 [ms] by substituting T=0.1, r=10 and W=0.6 to the equation (1). Supposing that the speed of the vehicle is 100 [km/h], the vehicle advances 2.65 [cm] in the detection time ΔT=0.955 [ms]. Also, if the road sign is nearer and exists at the position of 2 [m] ahead, r=2 is substituted. Thus, the detection time becomes ΔT=4.775 [ms], and the vehicle advances 13.26 [m].

Accordingly, the moving distance of the vehicle during the detection time of the feature becomes longer as the vehicle speed is faster and the objective feature is nearer.

The measurement time of the road sign estimated in the above study is several microseconds, during which it can be considered that the vehicle speed and the yaw rate do not change. Therefore, during the time period of measuring the road sign, the vehicle speed and the yaw rate maybe approximated as constant values. Thus, the coordinates of the feature will be calculated below by using a constant vehicle speed and a constant yaw rate value.

Figure 2B:
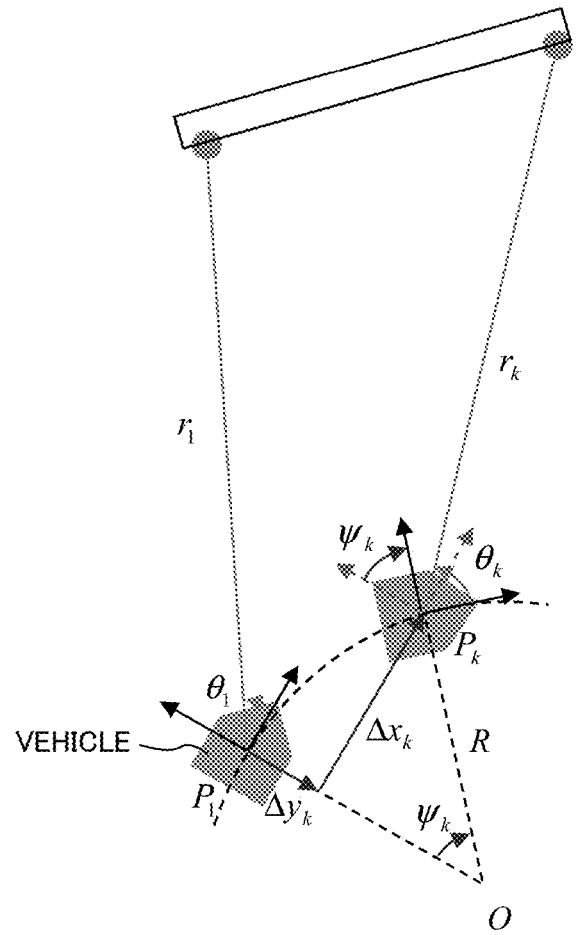

For example, in FIG. 2B, the coordinates of the feature measured at the point $P_k$ are converted to the values in the coordinate system of the point $P_1$. For that purpose, the rotation angle and the movement vectors of the coordinates are calculated to perform coordinate conversion. As to the order, first the coordinates are rotated to the coordinate axes indicated by the broken line at the point $P_k$, and then the positional differences ($\Delta x_k$, $\Delta y_k$) in the x-direction and the y-direction are added.

First, it is supposed that the value ($x_k$, $y_k$) in the xy coordinate system having the point $P_k$ as its origin is obtained as follows from the distance $r_k$ and the angle $\theta_k$ measured at the point $P_k$.

$$x_k = r_k \cos \theta_k, y_k = r_k \sin \theta_k$$

Since there is such a premise that the yaw rate $\Psi_{\_dot(t)}$ is constant, the variation amount $\Psi_k$ of the direction between the point $P_1$ to the point $P_k$ is as follows.

$$\Psi_k = \Psi_{\_dot(t)} \Delta t_k \quad (2)$$

Assuming a rotation radius R from an imaginary center point O, the following equation is obtained.

$$R = \frac{V}{\Psi_{\_dot(t)}}$$

Therefore, $\Delta x_k$ and $\Delta y_k$ are expressed as follows.

$$\left.\begin{aligned}\Delta x_k &= \frac{V}{\Psi_{\_dot(t)}} \sin \Psi_k & (\Psi_{\_dot(t)} \neq 0) \\ \Delta x_k &= V \Delta t_k & (\Psi_{\_dot(t)} = 0)\end{aligned}\right\} \quad (3)$$

$$\left.\begin{aligned}\Delta y_k &= \frac{V}{\Psi_{\_dot(t)}} (1 - \cos \Psi_k) & (\Psi_{\_dot(t)} \neq 0) \\ \Delta y_k &= 0 & (\Psi_{\_dot(t)} = 0)\end{aligned}\right\} \quad (4)$$

Therefore, when the point $P_1$ is used as the reference position, the coordinates of the feature measured at the point $P_k$ is calculated as follows.

$$\begin{bmatrix} x'_k \\ y'_k \end{bmatrix} = \begin{bmatrix} \cos \Psi_k & \sin \Psi_k \\ -\sin \Psi_k & \cos \Psi_k \end{bmatrix} \begin{bmatrix} x_k \\ y_k \end{bmatrix} + \begin{bmatrix} \Delta x_k \\ \Delta y_k \end{bmatrix} \quad (5)$$

FIG. 3 shows a result calculated by using the equations (3) and (4) and indicating the moving distance of the vehicle body when the detection time $\Delta T$ of the feature is: $\Delta T = 4.775$ [ms]. It is noted that the yaw rate value is smaller than 10 plus several [deg/s] in a normal traveling.

From the result shown in FIG. 3, it is understood that, even if the yaw rate is large, the moving amount in the lateral direction is very small. Also, it is understood that the moving distance in the vertical direction is not dependent on the yaw rate $\Psi_{\_dot(t)}$ and is only associated with the vehicle body speed V. The reason is as follow. Namely, since the value $\Delta T$ is small, the value $\Psi_{\_dot(t)} \Delta T$ is also small. Even if $\Psi_{\_dot(t)} = 90$ [deg/s], the value $\Psi_{\_dot(t)} \Delta T$ is not larger than 0.43 [deg/s], and it is almost the same as the straight traveling of $\Psi_{\_dot(t)} \Delta T = 0$ [deg/s]. It corresponds to a short circular arc in a circle having a large rotation radius R. Accordingly, when $\Delta T$ is small, it is possible to consider that the yaw rate $\Psi_{\_dot(t)} = 0$. Namely, the coordinates of the feature can be expressed by the following equation (6), which is a simplified form of the equation (5).

$$\begin{bmatrix} x'_k \\ y'_k \end{bmatrix} = \begin{bmatrix} \cos 0 & \sin 0 \\ -\sin 0 & \cos 0 \end{bmatrix} \begin{bmatrix} x_k \\ y_k \end{bmatrix} + \begin{bmatrix} V \Delta t_k \\ 0 \end{bmatrix} = \begin{bmatrix} x_k + V \Delta t_k \\ y_k \end{bmatrix} \quad (6)$$

This is true because the speed of the vehicle body can be a large value, but the yaw rate cannot be a large value. In other words, the movement of the vehicle has such a unique character that the turning speed is not large in comparison with the translational speed.

Here, it is supposed that the shape and the width of the objective feature are known by referring to high-precision map information. For example, by referring to the objective feature, it is known in advance that the feature is a flat road sign without damage and deformation and its width is W[m]. In this case, the initial detection data of the feature corresponds to the left edge of the road sign, and the last detection data of the feature corresponds to the right edge of the road sign.

Using this relation, since the distance between the left edge point ($x_1$, $y_1$) and the right edge point ($x'_1$, $y'_1$) of the road sign is "W", the following equation is obtained.

$$(x'_n - x_1)^2 + (y'_n - y_1)^2 = W^2$$

When the equation (6) is substituted to this equation, the following equation is obtained.

$$(x_n + V \Delta T - x_1)^2 + (y_n - y_1)^2 = W^2$$

Accordingly, the following equation is obtained.

$$x_n + V \Delta T - x_1 = \sqrt{W^2 - (y_n - y_1)^2}$$

Therefore, the vehicle body speed V can be calculated by the following equation (7).

$$V = \frac{\sqrt{W^2 - (y_n - y_1)^2} - (x_n - x_1)}{\Delta T} \quad (7)$$

Namely, the vehicle body speed V can be calculated by using the width W of the objective feature, the coordinates of the left edge point (hereinafter referred to as "left edge coordinates") ($x_1$, $y_1$) when the feature is detected, the coordinates of the right edge point (hereinafter referred to as "right edge coordinates") ($x_n$, $y_n$), and the detection time $\Delta T$ which is a time interval of between those two points. Since this speed is calculated during the detection of the feature in one scan by the LiDAR, it is an instantaneous speed. Therefore, even if the vehicle is accelerating or decelerating, this instantaneous speed can be calculated. By performing the similar speed calculation in the next scan by the LiDAR, the variation of the speed at every scan can be calculated, and therefore the acceleration of the moving body can also be detected.

The left edge and the right edge of the above-mentioned road sign is examples of the partial area of the invention. The left edge is an example of the first area of the invention, and the right edge is an example of the second area of the invention. Also, the time when the LiDAR 12 detects the left edge of the road sign is an example of the first time of the invention, and the time when the LiDAR 12 detects the right edge is an example of the second time of the invention. Further, the left edge coordinates are an example of the first coordinates of the invention, and the right edge coordinates are an example of the second coordinates of the invention.

Figure 4:
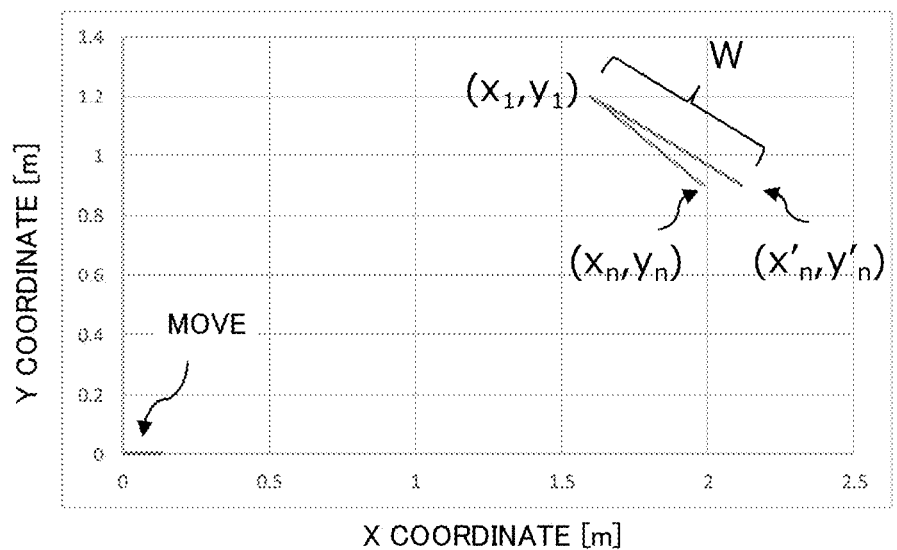
FIG. 4 illustrates an example of calculating a vehicle body speed when a width of a road sign serving as the feature is known.

Next, an example of numerical calculation by the equation (7) will be described with reference to FIG. 4. Now, it is supposed that the vehicle travels at the speed V=100 [km/h] and the yaw rate $\Psi_{dot(t)}$=−90 [deg/s], and a flat road sign having the width W=60 [cm] is detected. As the detected coordinates of the feature in the coordinate system having the vehicle position as its center, the left edge coordinates of the road sign are (1.60, 1.20) and the right edge coordinates of the road sign are (2.0085, 0.90). Also, the detection time ΔT from the left edge to the right edge of the road sign is 4.0 [ms]. Based on the above detection result, the vehicle body speed V will be calculated by using the equation (7).

When $x_1$=1.60, $y_1$=1.20, $x_n$=2.0085, $y_n$=0.90, ΔT=0.004 and W=0.6 are substituted to the equation (7), V=100 [km/h] is obtained. Thus, the same speed as the true value is calculated.

In this example of the numerical calculation, it is supposed that the error of the measurement accuracy of the LiDAR is extremely small. Since the measurement accuracy of the LiDAR is about 1cm in reality, the detected right edge coordinates become $x_n$=2.01. If the speed is calculated again with this value, it becomes V=98.7 [km/h] and the error increases.

Figure 5:
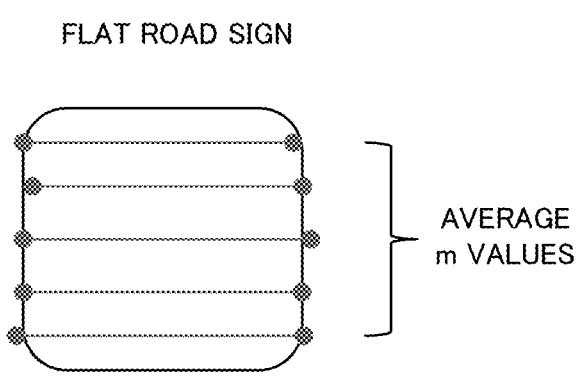
FIG. 5 illustrates an example of acquiring plural lateral data rows having different heights from a road sign.

However, in case of the road sign of square shape, while the height position may be different, the width is normally the same as shown in FIG. 5. Therefore, by performing the same calculation for some lateral data rows of some heights and calculating their average, it is possible to enhance the accuracy of the vehicle body speed V. For example, in case of the LiDAR which scans plural lines in the vertical direction, when "m" lateral data rows can be obtained for the same road sign as shown in FIG. 5, the average speed $V_{ave}$ can be calculated by dividing the sum of "m" speeds V of the vehicle body, calculated by the equation (7) for "m" lateral data rows, by "m".

[Device Configuration]

Figure 6:
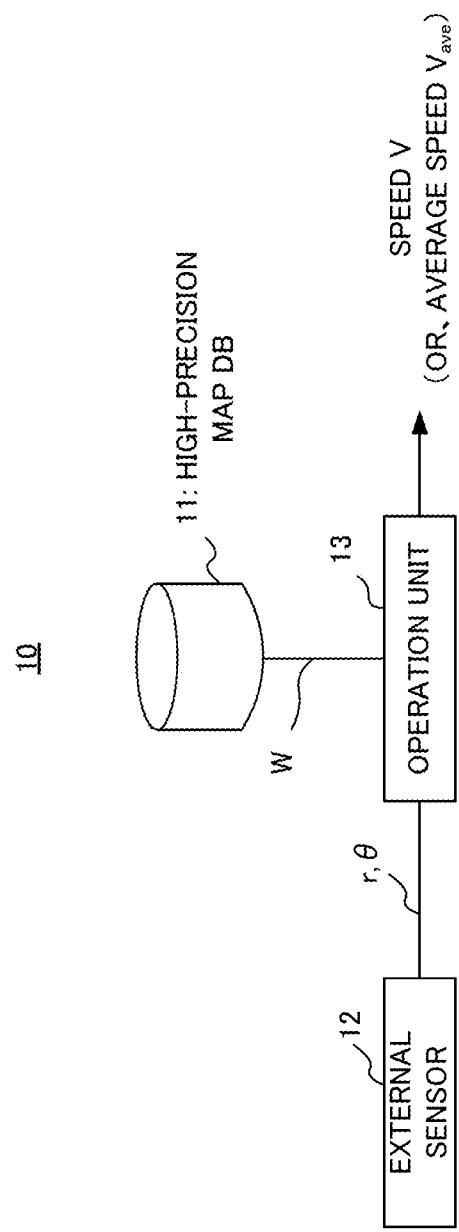
FIG. 6 illustrates a configuration of a measurement device according to an embodiment.

FIG. 6 illustrates a configuration of a measurement device according to the embodiment. The measurement device 10 includes a high-precision map database (DB) 11, a LiDAR 12 and an operation unit 13. The high-precision map DB 11 stores high-precision map information for each of the features. The high-precision map information includes a position of the feature on the map, and attribute information including a shape and a width of the feature. Instead of providing the high-precision map DB 11 in the measurement device 10, the high-precision map DB 11 may be provided in a server so that the measurement device 10 can access the high-precision map DB 11 in the server by communication.

The LiDAR 12 measures the distance r to the objective feature and the angle θ formed by the direction of the feature viewed from the vehicle and the traveling direction of the vehicle, and supplies them to the operation unit 13. Also, the LiDAR 12 measures the time required to scan from the left edge to the right edge of the feature, i.e., the detection time ΔT, and supplies it to the operation unit 13.

The operation unit 13 acquires the shape and the width W of the objective feature from the high-precision map DB 11. Also, the operation unit 13 acquires the distance r and the angle θ described above from the LiDAR 12, and calculates the coordinates of the feature using the vehicle position as its center based on them. Then, the operation unit 13 calculates the vehicle body speed V by the above-mentioned equation (7) based on the left edge coordinates ($x_1$, $y_1$) and the right edge coordinates ($x_n$, $y_n$) included in the calculated coordinates of the feature, the detection time ΔT and the width W of the feature. In addition, when plural lateral data rows having different height can be acquired for the same feature as shown in the example of FIG. 5, the operation unit 13 averages the plural vehicle body speeds V calculated based on each lateral data to calculate the above-mentioned average speed $V_{ave}$.

In the above configuration, the LiDAR 12 is an example of the first acquisition unit of the invention, and the operation unit 13 is an example of the second acquisition unit, the speed calculation unit, the coordinate calculation unit and the average speed calculation unit of the invention.

[Vehicle Body Speed Calculation Processing]

Figure 7:
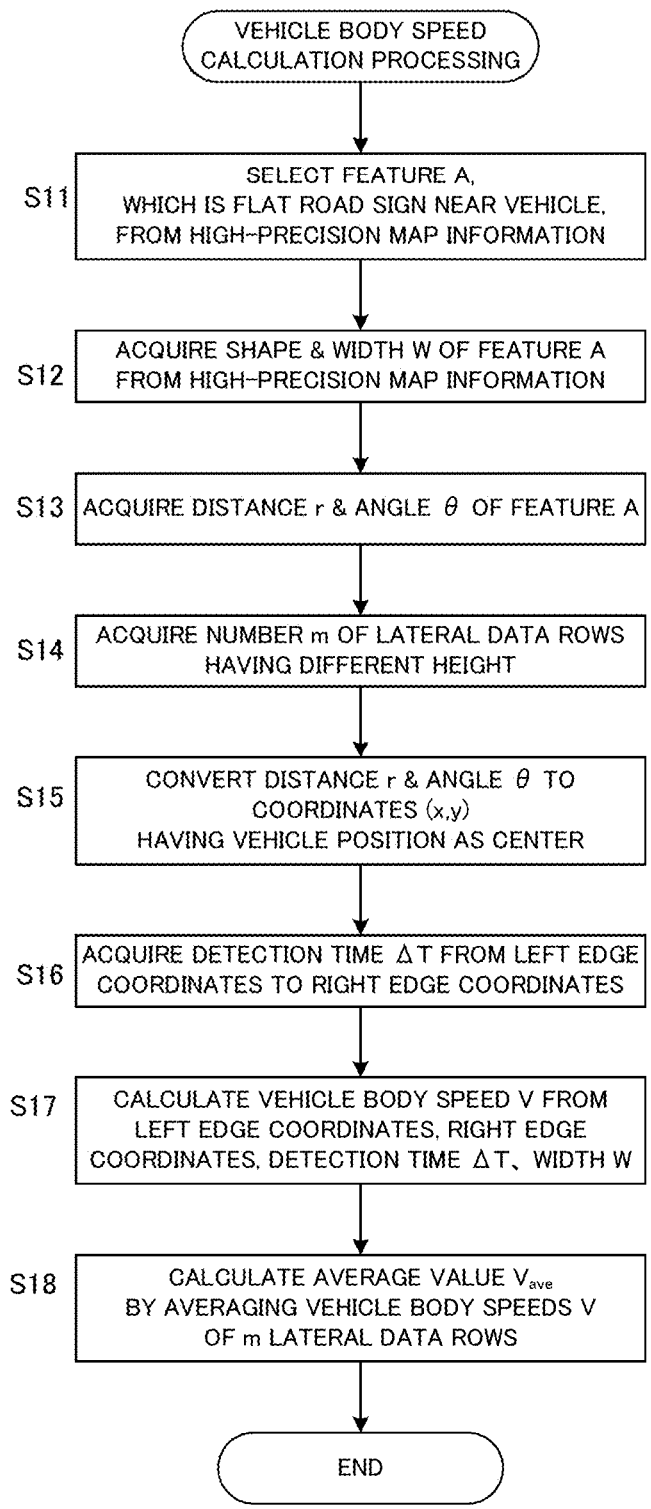
FIG. 7 is a flowchart illustrating a vehicle body speed calculation processing.

Next, vehicle body speed calculation processing executed by the measurement device 10 will be described. FIG. 7 is a flowchart of the vehicle body speed calculation processing. This processing is achieved by the computer, forming the operation unit 13 of the measurement device 13, which executes a program prepared in advance. It is noted that this flowchart is an example which calculates the above-mentioned average speed $V_{ave}$.

First, the operation unit 13 selects a feature A, which is a flat road sign existing near the vehicle, from the high-precision map information stored in the high-precision map DB 11 (step S11). Next, the operation unit 13 acquires the shape and the width W of the feature A from the high-precision map information (step S12). Next, the operation unit 13 acquires, from the LiDAR 12, the distance r from the vehicle position to the feature A and the angle θ formed by the direction of the feature A viewed from the vehicle position and the traveling direction of the vehicle (step S13).

Next, the operation unit 13 acquires a number "m" of the data rows of different height, measured by scanning the feature A by the LiDAR 12, from the LiDAR 12 (step S14). Next, the operation unit 13 converts the distance r and the angle θ to the coordinates (x, y) having the vehicle position as its center (step S15). Next, the operation unit 13 acquires the detection time ΔT, which is a time required for the LiDAR 12 to detect from the left edge coordinates to the right edge coordinates of the feature A, from the LiDAR 12 (step S16).

Next, the operation unit 13 calculates the vehicle body speed V by the above-mentioned equation (7) based on the left edge coordinates ($x_1$, $y_1$) and the right edge coordinates ($x_n$, $y_n$) of the feature A, the detection time ΔT and the width W of the feature A (step S17). Further, the operation unit 13 averages the vehicle body speeds V of "m" lateral data rows to calculate the average speed $V_{ave}$ (step S18). Then, the processing ends.

INDUSTRIAL APPLICABILITY

This invention can be used for a device loaded on a moving body.

DESCRIPTION OF REFERENCE NUMBERS

10 Measurement device
11 High-precision map database
12 LiDAR
13 Operation unit

The invention claimed is:

1. A measurement device comprising:
a non-transitory memory configured to store a program; and
a computer coupled to the non-transitory memory and configured to execute the program to:
acquire a distance from a vehicle to a partial area of a feature in the vehicle surroundings and an angle formed by a direction of viewing the partial area from the vehicle and a traveling direction of the vehicle, for a first area and a second area, the first area being the partial area at a first time, the second area being the partial area different from the first area at a second time;

acquire length information including a width of the feature from a map database; and calculate a speed of the vehicle from the first time to the second time based on the acquired distance from the vehicle to the partial area of the feature and the angle formed by the direction of viewing the partial area from the vehicle and the traveling direction of the vehicle, for the first area and the second area.

2. The measurement device according to claim 1, wherein the computer is further configured to calculate an average speed which is an average of the speeds of the vehicle calculated for plural combinations of the first area and the second area.

3. The measurement device according to claim 1, wherein the computer is further configured to;

calculate first coordinates, which are the coordinates of the first area with respect to a position of the vehicle serving as a center, based on the distance and the angle for the first area, and calculate second coordinates, which are the coordinates of the second area with respect to the position of the vehicle serving as the center, based on the distance and the angle for the second, wherein the speed of the vehicle is calculated based on the first coordinates, the second coordinates, the width of the feature and a time from the first time to the second time.

4. The measurement device according to claim 3, wherein the speed V of the vehicle is calculated by:

$$V = \frac{\sqrt{W^2 - (y_n - y_1)^2} - (x_n - x_1)}{\Delta T},$$

wherein the first coordinates are $(x_1, y_1)$, the second coordinates are $(x_n, y_n)$, the width of the feature is W, and the time from the first time to the second time is $\Delta T$.

5. A measurement method executed by a measurement device comprising:

a first acquisition process of acquiring a distance from a vehicle to a partial area of a feature and an angle formed by a direction of viewing the partial area from the vehicle and a traveling direction of the vehicle, for a first area and a second area, the first area being the partial area at a first time, the second area being the partial area different from the first area at a second time;

a second acquisition process of acquiring length information including a width of the feature from a map database; and a speed calculation process of calculating, a speed of the vehicle from the first time to the second time based on acquisition results by the first acquisition process and the second acquisition process.

6. A non-transitory computer-readable medium storing a program executed by a computer in a measurement device, the program causing the computer to:

acquire a distance from a vehicle to a partial area of a feature in the vehicle surroundings and an angle formed by a direction of viewing the partial area from the vehicle and a traveling direction of the vehicle, for a first area and a second area, the first area being the partial area at a. first time, the second area being the partial area different from the first area at a second time;

acquire length information including a width of the feature from a map database; and calculate a speed of the vehicle from the first time to the second time based on the acquired distance from the vehicle to the partial area of the feature and the angle formed by the direction of viewing the partial area from the vehicle and the traveling direction of the vehicle, for the first area and the second area.

* * * * *